United States Patent
Kapoor et al.

(10) Patent No.: US 12,021,706 B2
(45) Date of Patent: *Jun. 25, 2024

(54) ENTERPRISE PORT ASSIGNMENT

(71) Applicant: AT&T Intellectual Property I, L.P., Atlanta, GA (US)

(72) Inventors: Subhash Kapoor, Wall, NJ (US); Stanimir Bonev, Manalapan, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/295,300

(22) Filed: Apr. 4, 2023

(65) Prior Publication Data

US 2023/0246921 A1   Aug. 3, 2023

Related U.S. Application Data

(63) Continuation of application No. 17/484,678, filed on Sep. 24, 2021, now Pat. No. 11,652,695.

(51) Int. Cl.
| | |
|---|---|
| *G06F 15/173* | (2006.01) |
| *H04L 41/0893* | (2022.01) |
| *H04L 41/0896* | (2022.01) |
| *H04L 41/12* | (2022.01) |
| *H04L 41/5009* | (2022.01) |
| *H04L 41/5019* | (2022.01) |

(52) U.S. Cl.
CPC .......... *H04L 41/12* (2013.01); *H04L 41/0893* (2013.01); *H04L 41/0896* (2013.01); *H04L 41/5009* (2013.01); *H04L 41/5019* (2013.01)

(58) Field of Classification Search
CPC . H04L 41/12; H04L 41/0893; H04L 41/0896; H04L 41/5009; H04L 41/5019
See application file for complete search history.

(56) References Cited

U.S. PATENT DOCUMENTS

| | | | |
|---|---|---|---|
| 9,117,191 B2 | 8/2015 | Bowman et al. | |
| 11,652,695 B2 * | 5/2023 | Kapoor | H04L 41/5009 |
| | | | 709/224 |
| 2003/0223378 A1 * | 12/2003 | Ishwar | H04L 47/20 |
| | | | 370/254 |
| 2007/0140113 A1 | 6/2007 | Gemelos | |
| 2013/0114616 A1 | 5/2013 | Oh et al. | |
| 2015/0117454 A1 | 4/2015 | Koponen et al. | |
| 2016/0359642 A1 | 12/2016 | Song et al. | |
| 2017/0064717 A1 | 3/2017 | Filsfils et al. | |
| 2020/0153710 A1 | 5/2020 | Krayden et al. | |

* cited by examiner

*Primary Examiner* — Joseph R Maniwang
(74) *Attorney, Agent, or Firm* — Guntin & Gust, PLC; Mark Wilinski

(57) ABSTRACT

Methods, systems, and apparatuses may determine a connection topology for a service and send an alert in which the alert includes a service connection topology that includes a plurality of port assignments for each equipment of the connection topology.

20 Claims, 5 Drawing Sheets

ENTERPRISE PORT ASSIGNMENT

CROSS REFERENCE TO RELATED APPLICATIONS

This application is a continuation of U.S. patent application Ser. No. 17/484,678 filed on Sep. 24, 2021. All sections of the aforementioned application are incorporated herein by reference in their entirety.

BACKGROUND

Provisioning systems typically involve configuration of network protocol packet processing and service parameters at each port in each networking system. After network configuration is done at each port the ports are bound so that the two ports can communicate using an appropriate network packet format.

This background information is provided to reveal information believed by the applicant to be of possible relevance. No admission is necessarily intended, nor should be construed, that any of the preceding information constitutes prior art.

SUMMARY

Methods, systems, and apparatuses may determine, based on equipment inventory, service parameters, or service endpoints, a connection topology for the service and automatically send an alert, in which the alert includes the connection topology for the service, which include a plurality of port assignments for each equipment of the connection topology.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

Reference will now be made to the accompanying drawings, which are not necessarily drawn to scale.

DETAILED DESCRIPTION

Conventionally, there may be various different port assignment engines at each layer (e.g., separately at Layer 2, Layer 3, or Layer 4) of a network. Conventional port assignment engines are limited in scope, in which their major role is just to find an available port on a device in the network. The disclosed subject matter allows for the dynamic assignment of ports for a service path (e.g., connection topology), which may be used to find an optimal path in the network at multiple layers.

Figure 1:
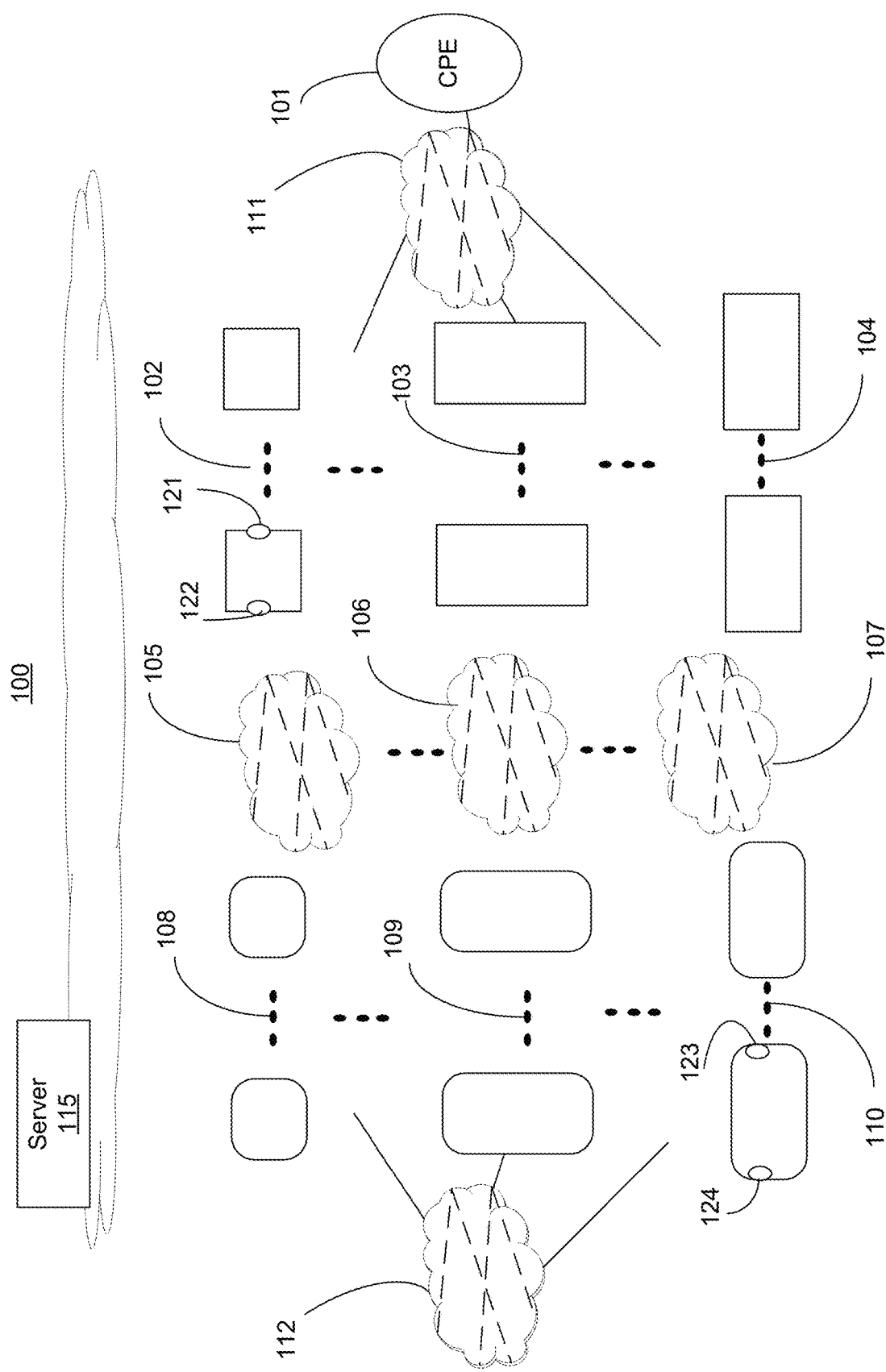
FIG. 1 illustrates an exemplary system for enterprise port assignment.

FIG. 1 illustrates an exemplary system 100 for enterprise port assignment. As shown with system 100, there may be customer premise equipment 101 (CPE 101) which is located at a customer premise. CPE 101 may connect to network 111 which may have multiple paths to different network devices (physical or virtual), such as network devices 102, network devices 103, or network device 104. Further, network device 102, network device 103, or network devices 104 may connect with any plurality of networks, such as network 105, network 106, or network 107. Network 105, network 106, or network 107 may also have multiple paths that may connect with multiple devices, such as network devices 108, network devices 109, network devices 110. Network devices 108, network devices 109, network devices 110 may connect with network 112 and so on and so forth. Each connection may require a physical or virtual port assignment associated with different layers for a service. Server 115 may be communicatively connected with each device or network of system 100. Server 115 may be used to determine and automatically assign or select the appropriate service path, which may include multiple network devices and physical or virtual ports.

Figure 2:
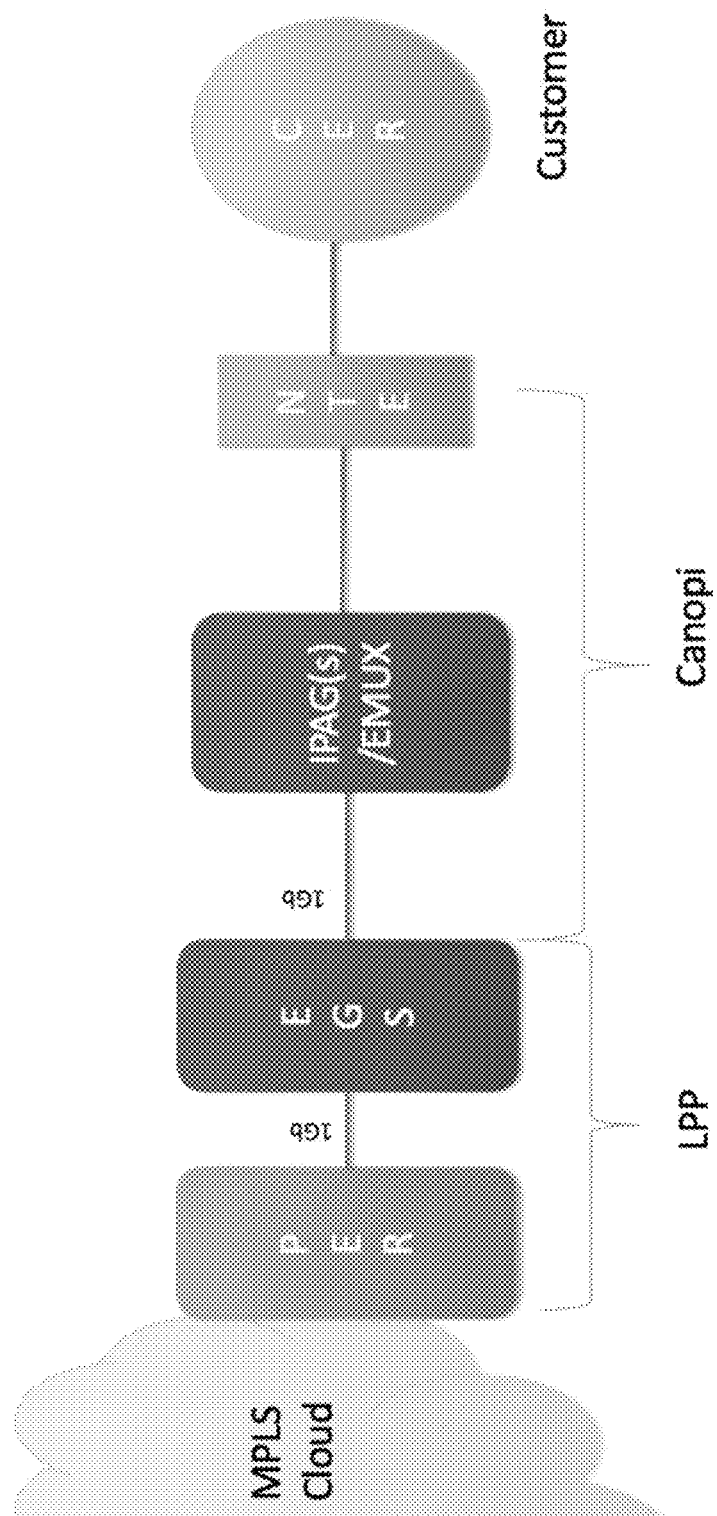
FIG. 2 illustrates an exemplary system for enterprise port assignment.

Table 1 defines abbreviations or acronyms. Table 2 provides examples of use cases for enterprise port assignment (EPA). In an example, there may an SDN-A application that has multiple services, such as P1, P2, NCX-Hub, or DCU. The disclosed system may analyze the application, the selected service, and prepare the service path, which may include assigning and selecting the optimal port for the service path at multiple layers (e.g., open systems interconnection layers). With reference to FIG. 1, the ports may be virtual or physical ports, that may include port 121-port 124, based on different factors, as disclosed in more detail herein. As shown in FIG. 2, there is Canopi and LPP, which are different application. They manage separate sets of network equipment, CANOPI manages L2 IPAG network, LPP manages L3 access and backbone routers. Some services, like AVPN, ADI, ASE use both sets of equipment and, conventionally, equipment (port) selection is done separately in both applications. In fact, in CANOPI it is done manually. As disclosed, with EPA, the network equipment is managed in the same place in terms of homing and capacity and optimization of the network. This may give network providers perspective regarding where and how to invest and expand the network on one hand, and add automation to the provisioning processes, both for infrastructure and for customer services.

TABLE 1

| Abbreviations | Definitions |
| --- | --- |
| SDN | Software Defined Network |
| SDN-A | SDN controller for Access |
| LPP | Logical Provisioning Platform |
| SDNGC | SDN Global Controller |
| SDNAD | SDN controller for Access, Design |
| CANOPI | Converged Network Operations Provisioning & Inventory |
| AVPN | VPN |
| ASE3PA | ASE -Switched Ethernet, 3rd Party Access |
| ADI | Direct Internet |
| SD-WAN | Software Defined Wide Area Network |
| SAREA | Standard Access Remote Ethernet Aggregation |
| ASEoD | ASE on Demand |
| DCU | Dedicated Capacity Unit |
| NCX-Hub | Network Cloud Leaf |

TABLE 1-continued

| Abbreviations | Definitions |
| --- | --- |
| P1 | Project 1 |
| P2 | Project 2 |

With continued reference to Table 2, the table shows the PA function conventionally in place in these applications. Although not exactly the same, all these functions are related to selection of network equipment (port, VNF) and allocating network capacity. Conventionally these functions have different level of automation in different applications. EPA automates this process end to end and at the same time manages the network capacity. EPA provides for automatically finding an optimum path for a service in the network (e.g., it selects and assign the ports in the path). In the VNF case, since VNFs are dynamically created (on demand), EPA also needs to determine where the VNF is created (e.g., VNF homing) and then assign the VNF (e.g., port on VNF). In addition, path selection may also be based on available capacity, such as bandwidth, number of connections on the same port, etc. Since some IDs are selected from a range, potentially they limit the capacity as well, so assigning those IDs, like VLAN ID, may be part of the selection and assignment process. Example functions, as shown in Table 2, are currently performed by separate applications, implemented in different ways, with various degree of automation. Based on the disclosed EPA that includes end to end assignment automation, the functions in Table 2 may be necessarily performed during that end-to-end assignment.

TABLE 2

| Application | Services | Component | Function |
| --- | --- | --- | --- |
| 5SDN-A | P1<br>P2<br>NCX-Hub<br>DCU | Resource Allocator | Port selection and assignment<br>VLAN Id Assignment<br>Circuit Name Generation<br>Links/VLAN<br>Service Instance Id Generation |
| LPP | AVPN<br>ASE3PA<br>ADI<br>SD-WAN | Port Assignment | Service homing<br>L2 and L3 port assignment<br>Capacity reservation |
| SDNGC | SD-WAN | Conductor<br>Resource Allocator | VNF homing<br>VNF assignment<br>Capacity reservation |
| SDNAD | SAREA | Resource Allocator | Port selection and assignment<br>VLAN Id Assignment<br>Bandwidth Limits<br>Evc Limits |
| CANOPI | ASE/AS<br>EoD<br>OEW/<br>ADI/<br>AVPN-SCP | | Port selection and assignment |
| Granite | | | L2 port assignment |

Figure 3:
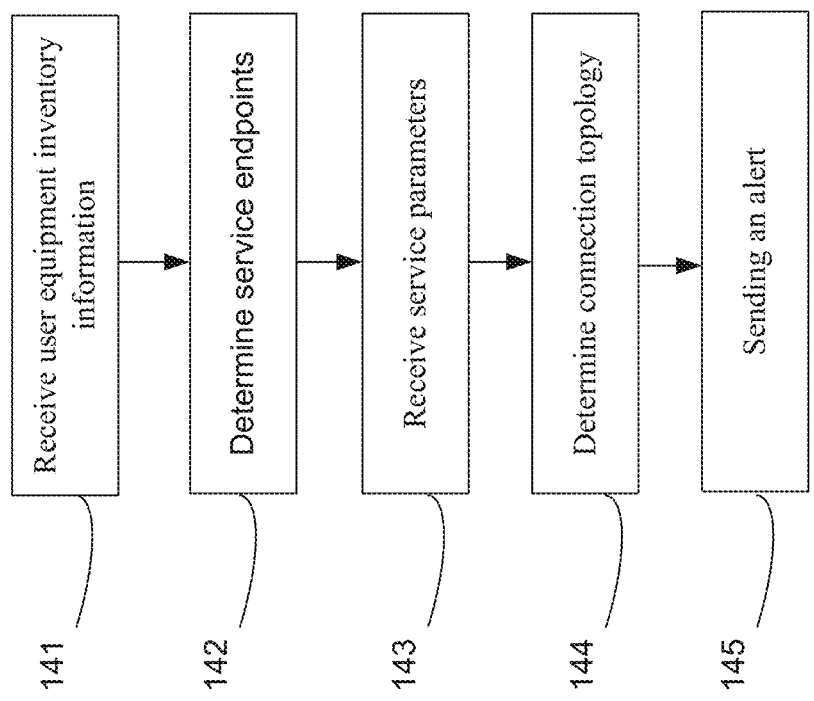
FIG. 3 illustrates an exemplary method for enterprise port assignment.

FIG. 3 illustrates an exemplary method for enterprise port assignment. At step 141, server 115 may receive equipment inventory information. The equipment inventory information may include information regarding the equipment for multiple connection topologies (e.g., service paths). As shown in FIG. 1, there may be many different devices and paths in a network that may be used to place a service in operation. Server 115 may obtain the equipment inventory information of the different equipment. The equipment inventory information may include information about the vendor of the equipment, the model of the equipment, the operating system version of the equipment, the type of the equipment (e.g., router, switch, fiber module, etc.), or function of the equipment (e.g., route reflector or optical network terminal).

With continued reference to FIG. 3, at step 142, an indication of a selection of service endpoints may be received. For example, there may be an indication to implement the service from CPE 101 to network 112. In another example, the endpoints may be inferred by the type of service or other information. At step 143, a parameter of a service may be received. The parameter for the service may include a type of the service, location of the service, minimum upload speed of the service, minimum download speed of the service, quality of service profile of the service, latency requirement of the service, type of connection preferred or required by the service, or service level agreement requirement of the service, among other things. The type of the service (e.g., see Table 2) may include Internet access, virtual private network (VPN), software-defined networking in a wide area network (SD-WAN), Internet protocol television (IPTV), voice over Internet protocol (VoIP), or Ethernet virtual circuit (EVC), among others.

At step 144, a connection topology may be determined based on the information of step 141-step 143, such as equipment inventory information, a parameter of the service, or the service endpoints. In another example, the connection topology may be determined based on information such as homing rules, which may include a homing constraint, a homing preference, or a homing capacity rule. In an example, the homing preference includes a preference to choose the closest equipment to a location of the service or port with least available bandwidth. In an example, the homing capacity rule includes a maximum port bandwidth for the service, maximum number of virtual services, or maximum number of subinterfaces (e.g., logical subdivision of physical or virtual interfaces). The connection topology may be determined based on a consideration of one or more thresholds (e.g., homing capacity rule, number of virtual services, bandwidth, etc.), which may assist in optimizing the use of a service or the network facilities. In a first example, there may be a homing rule for a particular service that requires ports of the service to have maximum average bandwidth threshold (e.g., exclude ports with less than 1 gigabyte and have an average percentage of use of 60%). In a second example, there may be a homing rule that requires a threshold type or amount of hardware or software resources. The hardware or software resources may include a virtual computer processing unit (vCPU), a network interface card (NIC), or computer memory. The homing rule may help balance traffic or require the consideration of particular network equipment or port until it reaches a threshold resource usage (e.g., 60% memory or 70% bandwidth usage).

With continued reference to FIG. 3, at step 145, an alert may be automatically sent based on the determining of step 144. The alert may include a description of the connection topology for the service (e.g., a map or text description) or other information. The other information may include the connection topology for the same or different services along the same or similar service path (e.g., two or more identical ports for the connection topology). The connection topology may include a plurality of port assignments for each equipment or network. In another example, the alert of step 145 may include instructions to the equipment of system 100 to assign or implement the port assignments according to the connection topology.

The disclosed EPA system can manage network capacity. The EPA may determine ports for multiple layers while preparing a connection topology (e.g., a service path), such as layers 1, 2, 3, or 4 with regard to physical or virtual network devices. The service path may be optimized after evaluating several factors, such as endpoints for a selected service, connection type, service parameters, equipment inventory information, network inventory information, equipment specific rules, service or connection specific rules, or resource information associated with the equipment or network, among other things. The disclosed EPA system may also help optimize a service based on distance (e.g., minimize provisioning connection length), latency (e.g., minimal latency), or licensing. Licensing is an example of parameters or restrictions that we may have during homing, e.g., based on licensing cost, we may decide to reuse a VNF, or where to create a new one. The EPA system may use machine learning to automate network capacity planning and management and provide information that may be used for predictive analysis in a network. For example, the EPA system may produce reports on used and available capacity and utilization trends and may proactively and dynamically adjust homing rules (e.g., based on utilization patterns of one or more layers).

Figure 4:
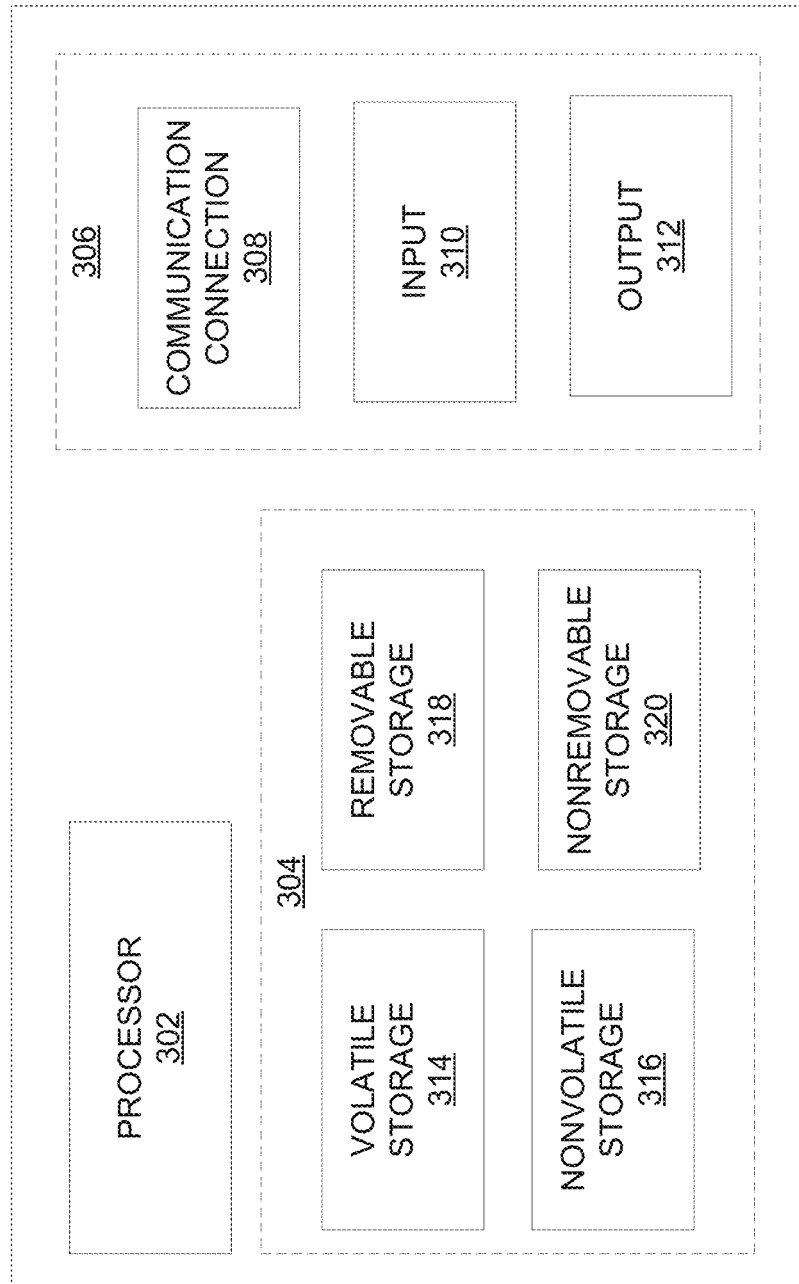
FIG. 4 illustrates a schematic of an exemplary network device.

FIG. 4 is a block diagram of network device 300 that may be connected to or include a component of system 100. Network device 300 may comprise hardware or a combination of hardware and software. The functionality to facilitate telecommunications via a telecommunications network may reside in one or combination of network devices 300. Network device 300 depicted in FIG. 4 may represent or perform functionality of an appropriate network device 300, or combination of network devices 300, such as, for example, a component or various components of a cellular broadcast system wireless network, a processor, a server, a gateway, a node, a mobile switching center (MSC), a short message service center (SMSC), an automatic location function server (ALFS), a gateway mobile location center (GMLC), a radio access network (RAN), a serving mobile location center (SMLC), or the like, or any appropriate combination thereof. It is emphasized that the block diagram depicted in FIG. 4 is exemplary and not intended to imply a limitation to a specific implementation or configuration. Thus, network device 300 may be implemented in a single device or multiple devices (e.g., single server or multiple servers, single gateway or multiple gateways, single controller or multiple controllers). Multiple network entities may be distributed or centrally located. Multiple network entities may communicate wirelessly, via hard wire, or any appropriate combination thereof.

Network device 300 may comprise a processor 302 and a memory 304 coupled to processor 302. Memory 304 may contain executable instructions that, when executed by processor 302, cause processor 302 to effectuate operations associated with mapping wireless signal strength.

In addition to processor 302 and memory 304, network device 300 may include an input/output system 306. Processor 302, memory 304, and input/output system 306 may be coupled together (coupling not shown in FIG. 4) to allow communications between them. Each portion of network device 300 may comprise circuitry for performing functions associated with each respective portion. Thus, each portion may comprise hardware, or a combination of hardware and software. Input/output system 306 may be capable of receiving or providing information from or to a communications device or other network entities configured for telecommunications. For example, input/output system 306 may include a wireless communications (e.g., 3G/4G/GPS) card. Input/output system 306 may be capable of receiving or sending video information, audio information, control information, image information, data, or any combination thereof. Input/output system 306 may be capable of transferring information with network device 300. In various configurations, input/output system 306 may receive or provide information via any appropriate means, such as, for example, optical means (e.g., infrared), electromagnetic means (e.g., RF, Wi-Fi, Bluetooth®, ZigBee®), acoustic means (e.g., speaker, microphone, ultrasonic receiver, ultrasonic transmitter), or a combination thereof. In an example configuration, input/output system 306 may comprise a Wi-Fi finder, a two-way GPS chipset or equivalent, or the like, or a combination thereof.

Input/output system 306 of network device 300 also may contain a communication connection 308 that allows network device 300 to communicate with other devices, network entities, or the like. Communication connection 308 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 306 also may include an input device 310 such as keyboard, mouse, pen, voice input device, or touch input device. Input/output system 306 may also include an output device 312, such as a display, speakers, or a printer.

Processor 302 may be capable of performing functions associated with telecommunications, such as functions for processing broadcast messages, as described herein. For example, processor 302 may be capable of, in conjunction with any other portion of network device 300, determining a type of broadcast message and acting according to the broadcast message type or content, as described herein.

Memory 304 of network device 300 may comprise a storage medium having a concrete, tangible, physical structure. As is known, a signal does not have a concrete, tangible, physical structure. Memory 304, as well as any computer-readable storage medium described herein, is not to be construed as a signal. Memory 304, as well as any computer-readable storage medium described herein, is not to be construed as a transient signal. Memory 304, as well as any computer-readable storage medium described herein, is not to be construed as a propagating signal. Memory 304, as well as any computer-readable storage medium described herein, is to be construed as an article of manufacture.

Memory 304 may store any information utilized in conjunction with telecommunications. Depending upon the exact configuration or type of processor, memory 304 may include a volatile storage 314 (such as some types of RAM), a nonvolatile storage 316 (such as ROM, flash memory), or a combination thereof. Memory 304 may include additional storage (e.g., a removable storage 318 or a non-removable storage 320) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by network device 300. Memory 304 may comprise executable instructions that, when executed by processor 302, cause processor 302 to effectuate operations to map signal strengths in an area of interest.

Figure 5:
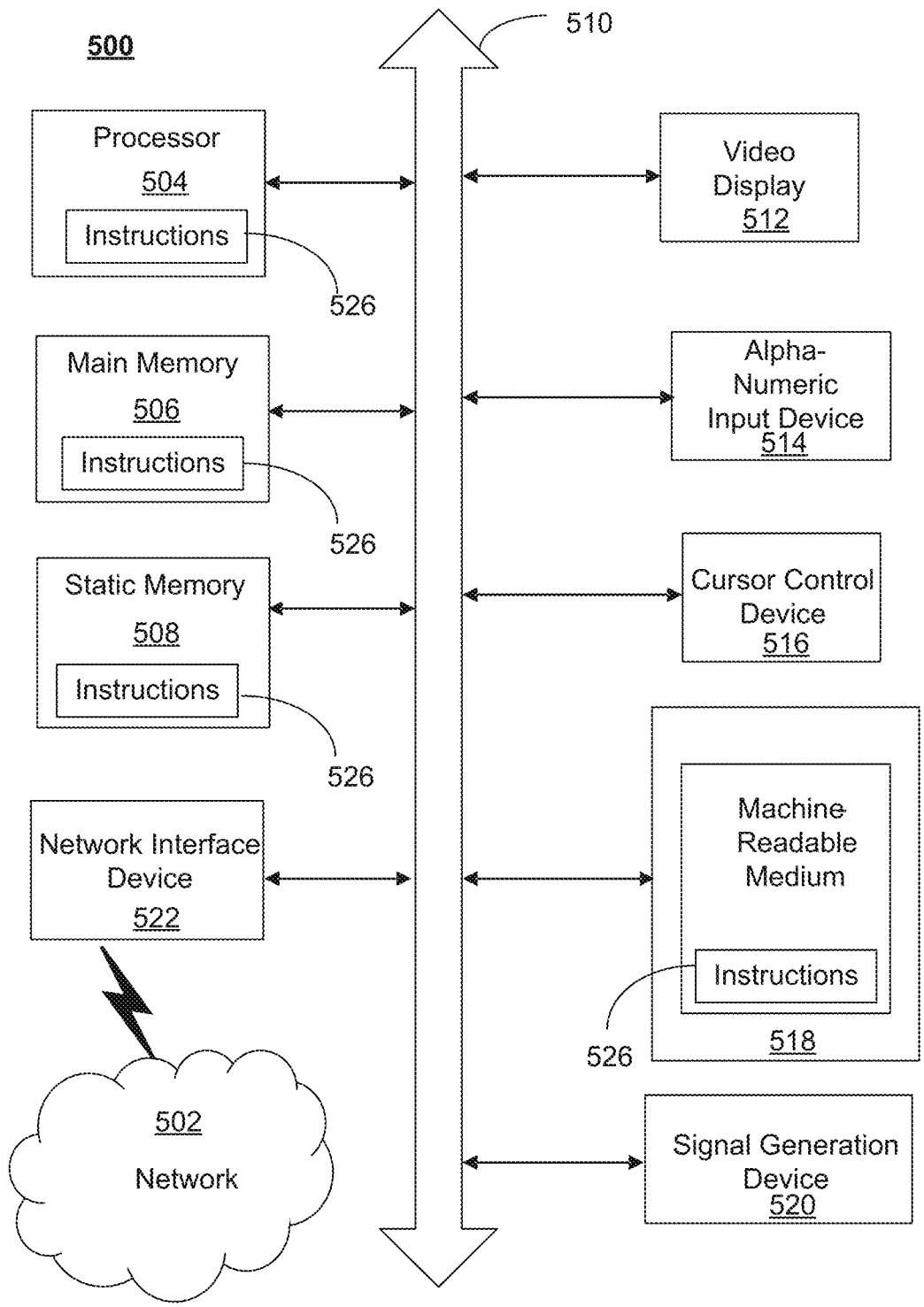
FIG. 5 illustrates an exemplary communication system that provides wireless telecommunication services over wireless communication networks.

FIG. 5 depicts an exemplary diagrammatic representation of a machine in the form of a computer system 500 within which a set of instructions, when executed, may cause the machine to perform any one or more of the methods described above. One or more instances of the machine can operate, for example, as processor 302, CPE 10, network device 102, network device 103, or network devices 104 and other devices of FIG. 1 or FIG. 2. In some examples, the machine may be connected (e.g., using a network 502) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

Computer system 500 may include a processor (or controller) 504 (e.g., a central processing unit (CPU)), a graphics processing unit (GPU, or both), a main memory 506 and a static memory 508, which communicate with each other via a bus 510. The computer system 500 may further include a display unit 512 (e.g., a liquid crystal display (LCD), a flat panel, or a solid state display). Computer system 500 may include an input device 514 (e.g., a keyboard), a cursor control device 516 (e.g., a mouse), a disk drive unit 518, a signal generation device 520 (e.g., a speaker or remote control) and a network interface device 522. In distributed environments, the examples described in the subject disclosure can be adapted to utilize multiple display units 512 controlled by two or more computer systems 500. In this configuration, presentations described by the subject disclosure may in part be shown in a first of display units 512, while the remaining portion is presented in a second of display units 512.

The disk drive unit 518 may include a tangible computer-readable storage medium on which is stored one or more sets of instructions (e.g., software 526) embodying any one or more of the methods or functions described herein, including those methods illustrated above. Instructions 526 may also reside, completely or at least partially, within main memory 506, static memory 508, or within processor 504 during execution thereof by the computer system 500. Main memory 506 and processor 504 also may constitute tangible computer-readable storage media.

As described herein, a telecommunications system may utilize a software defined network (SDN). SDN and a simple IP may be based, at least in part, on user equipment, that provide a wireless management and control framework that enables common wireless management and control, such as mobility management, radio resource management, QoS, load balancing, etc., across many wireless technologies, e.g. LTE, Wi-Fi, and future 5G access technologies; decoupling the mobility control from data planes to let them evolve and scale independently; reducing network state maintained in the network based on user equipment types to reduce network cost and allow massive scale; shortening cycle time and improving network upgradability; flexibility in creating end-to-end services based on types of user equipment and applications, thus improve customer experience; or improving user equipment power efficiency and battery life—especially for simple M2M devices—through enhanced wireless management.

While examples of a system in which enterprise port assignment alerts can be processed and managed have been described in connection with various computing devices/processors, the underlying concepts may be applied to any computing device, processor, or system capable of facilitating a telecommunications system. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes a device for telecommunications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language, and may be combined with hardware implementations.

The methods and devices associated with a telecommunications system as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes a device for implementing telecommunications as described herein. When implemented on a general-purpose processor, the program code combines with the processor to provide a unique device that operates to invoke the functionality of a telecommunications system.

While the disclosed systems have been described in connection with the various examples of the various figures, it is to be understood that other similar implementations may be used or modifications and additions may be made to the described examples of a telecommunications system without deviating therefrom. For example, one skilled in the art will recognize that a telecommunications system as described in the instant application may apply to any environment, whether wired or wireless, and may be applied to any number of such devices connected via a communications network and interacting across the network. Therefore, the disclosed systems as described herein should not be limited to any single example, but rather should be construed in breadth and scope in accordance with the appended claims.

In describing preferred methods, systems, or apparatuses of the subject matter of the present disclosure—enterprise port assignment—as illustrated in the Figures, specific terminology is employed for the sake of clarity. The claimed subject matter, however, is not intended to be limited to the specific terminology so selected. In addition, the use of the word "or" is generally used inclusively unless otherwise provided herein.

This written description uses examples to enable any person skilled in the art to practice the claimed subject matter, including making and using any devices or systems and performing any incorporated methods. Other variations of the examples are contemplated herein.

Methods, systems, and apparatuses, among other things, as described herein may provide for receiving equipment inventory associated with a plurality of connection topologies of a network; receiving a selection of at least a first endpoint and a second endpoint to be provisioned in the network, between an enterprise device and a core network device; receiving a parameter for a service; based on the equipment inventory, the parameter for the service, and the first endpoint and the second endpoint, determining a connection topology for the service; and automatically sending an alert, wherein the alert includes the connection topology for the service, wherein the connection topology includes a plurality of port assignments for each equipment of the connection topology. The parameter for the service may include type of the service, location of the service, minimum upload speed of the service, minimum download speed of the service, quality of service profile of the service, latency requirement of the service, or service level agreement requirement of the service. The equipment inventory information may include vendor of equipment, model of equipment, operating system version of equipment, type of equipment, wherein the type of equipment includes a router or a switch, or function of equipment, wherein the function of the equipment includes optical network terminal or route reflector. The determining the connection topology for the service is further based on a homing rule, wherein the homing rule may include: a homing constraint, a homing preference, wherein the homing preference comprises closest equipment to a location of the service or port with least available bandwidth, or a homing capacity rule, wherein the homing capacity rule comprises maximum port bandwidth for the service, maximum number of virtual services, or maximum number of subinterfaces. All combinations in this paragraph (including the removal or addition of steps) are contemplated in a manner that is consistent with the other portions of the detailed description.

What is claimed:

1. A method comprising:
    receiving, by a processing system including a processor, equipment inventory information associated with a plurality of connection topologies of a network;
    receiving, by the processing system, a selection of at least a first endpoint and a second endpoint to be provisioned in the network, between an enterprise device and a core network device;
    receiving, by the processing system, a parameter for a service;
    based on the equipment inventory information, the parameter for the service, the first endpoint and the second endpoint, and a homing rule, determining, by the processing system, a connection topology for the service, the connection topology comprising equipment; and
    automatically sending, by the processing system, an alert, wherein the alert comprises the connection topology for the service, and wherein the connection topology comprises a plurality of port assignments for each equipment of the connection topology,
    wherein the homing rule comprises a homing capacity rule, and wherein the homing capacity rule comprises a maximum port bandwidth for the service, a maximum number of virtual services, or a maximum number of subinterfaces.

2. The method of claim 1, wherein the parameter for the service comprises: a type of the service, a location of the service, a minimum upload speed of the service, a minimum download speed of the service, a quality of service profile of the service, a latency requirement of the service, or a service level agreement requirement of the service.

3. The method of claim 1, wherein the parameter for the service comprises:
    a type of the service, wherein the type of the service comprises an Internet access, a virtual private network (VPN), a software-defined networking in a wide area network (SD-WAN), an Internet protocol television (IPTV), a voice over Internet protocol (VoIP), or an Ethernet virtual circuit (EVC).

4. The method of claim 1, wherein the parameter for the service comprises:
    a location of the service,
    a minimum upload speed of the service, or
    a minimum download speed of the service.

5. The method of claim 1, wherein the parameter for the service comprises:
    a quality of service profile of the service,
    a latency requirement of the service, or
    a service level agreement requirement of the service.

6. The method of claim 1, wherein the equipment inventory information comprises:
    a vendor of equipment,
    a model of equipment,
    an operating system version of equipment,
    a type of equipment, wherein the type of equipment comprises a router or a switch, or
    a function of equipment, wherein the function of the equipment comprises an optical network terminal or a route reflector.

7. The method of claim 1, wherein the equipment inventory information comprises an operating system version of equipment.

8. The method of claim 1, wherein the homing rule comprises a homing constraint.

9. The method of claim 1, wherein the homing rule comprises a homing preference.

10. The method of claim 1, wherein the homing rule requires a threshold type or amount of hardware or software resources.

11. An apparatus comprising:
    a processor; and
    a memory coupled with the processor, the memory storing executable instructions that when executed by the processor cause the processor to effectuate operations comprising:
        receiving equipment inventory information associated with a plurality of connection topologies of a network;
        receiving a selection of at least a first endpoint and a second endpoint to be provisioned in the network;

receiving a parameter for a service;

based on the equipment inventory information, the parameter for the service, the first endpoint and the second endpoint, and a homing rule, determining a connection topology for the service, the connection topology comprising equipment; and sending an alert, wherein the alert comprises the connection topology for the service, wherein the connection topology comprises a plurality of port assignments for each equipment of the connection topology, wherein the homing rule comprises a homing preference, wherein the homing preference comprises a closest equipment to a location of the service or a port with a least available bandwidth.

12. The apparatus of claim 11, wherein the parameter for the service comprises a type of the service, a location of the service, a minimum upload speed of the service, a minimum download speed of the service, a quality of service profile of the service, a latency requirement of the service, or a service level agreement requirement of the service.

13. The apparatus of claim 11, wherein the parameter for the service comprises:

a type of the service, wherein the type of the service comprises an Internet access, a virtual private network (VPN), a software-defined networking in a wide area network (SD-WAN), an Internet protocol television (IPTV), a voice over Internet protocol (VoIP), or an Ethernet virtual circuit (EVC).

14. The apparatus of claim 11, wherein the parameter for the service comprises:

a location of the service, a minimum upload speed of the service, or a minimum download speed of the service.

15. The apparatus of claim 11, wherein the parameter for the service comprises:

a quality of service profile of the service, a latency requirement of the service, or a service level agreement requirement of the service.

16. The apparatus of claim 11, wherein the equipment inventory information comprises:

a vendor of equipment, a model of equipment, an operating system version of equipment, a type of equipment, wherein the type of equipment comprises a router or a switch, or a function of equipment, wherein the function of the equipment comprises an optical network terminal or a route reflector.

17. The apparatus of claim 11, wherein the equipment inventory information comprises an operating system version of equipment.

18. The apparatus of claim 11, wherein the homing rule comprises a homing constraint.

19. A non-transitory computer-readable storage medium comprising instructions that, when executed by a processor, cause the processor to perform operations, the operations comprising:

receiving equipment inventory information associated with a plurality of connection topologies of a network;

receiving a selection of at least a first endpoint and a second endpoint to be provisioned in the network, between an enterprise device and a core network device;

receiving a parameter for a service;

based on the equipment inventory information, the parameter for the service, the first endpoint and the second endpoint, and a homing rule, determining a connection topology for the service, the connection topology comprising equipment; and sending an alert, wherein the alert comprises the connection topology for the service, wherein the connection topology comprises at least one port assignment for each equipment of the connection topology, wherein the homing rule comprises a homing capacity rule, wherein the homing capacity rule comprises a maximum port bandwidth for the service, a maximum number of virtual services, or a maximum number of subinterfaces.

20. The non-transitory computer-readable storage medium of claim 19, wherein the homing capacity rule comprises the maximum number of subinterfaces, and wherein the maximum number of subinterfaces is specified in terms of a subdivision of physical interfaces and virtual interfaces.

* * * * *